US005253683A

United States Patent [19]

Ekren et al.

[11] Patent Number: 5,253,683

[45] Date of Patent: Oct. 19, 1993

[54] METHOD AND APPARATUS FOR DISPENSING DESICCANT MATERIALS INTO WINDOW SPACER FRAMES

[75] Inventors: Dennis J. Ekren; Kenneth C. Seaton, both of Denver, Colo.

[73] Assignee: Tools for Bending, Inc., Denver, Colo.

[21] Appl. No.: 801,611

[22] Filed: Nov. 20, 1991

Related U.S. Application Data

[63] Continuation of Ser. No. 425,006, Oct. 23, 1989, abandoned.

[51] Int. Cl.[5] .................... B23P 23/00

[52] U.S. Cl. .................... 141/67; 141/269; 29/527.1; 29/33 T

[58] Field of Search .................... 141/59, 67, 263, 269; 29/527.1, 527.4, 333 T, 33 K, DIG. 3, 458; 52/172; 427/181

[56] References Cited

U.S. PATENT DOCUMENTS

| | | | |
|---|---|---|---|
| 2,037,893 | 4/1936 | Greenan | 428/81 |
| 3,030,673 | 4/1962 | London | 52/172 W |
| 3,183,560 | 5/1965 | Brichard | 428/34 |
| 3,280,523 | 10/1966 | Stroud et al. | 52/172 |
| 3,762,772 | 10/1973 | Fuss | 141/67 X |
| 3,942,561 | 3/1976 | Stoeffler | 141/67 |
| 4,151,696 | 5/1979 | Knights et al. | 52/741 |
| 4,261,145 | 4/1981 | Bröcking | 52/172 |
| 4,279,065 | 7/1981 | Sernevi | 29/33 K |
| 4,628,582 | 12/1986 | Leopold | 29/458 X |
| 4,660,271 | 4/1987 | Lenhardt | 29/527.4 |
| 4,664,160 | 5/1987 | Rothstein et al. | 141/67 |
| 4,698,891 | 10/1987 | Borys | 29/417 |
| 4,803,764 | 2/1989 | Lenhardt et al. | 29/33 K |
| 4,886,095 | 12/1989 | Lisec | 141/59 X |
| 4,912,837 | 4/1990 | Bayer | 29/33 T X |
| 4,945,956 | 8/1990 | Bueyuekgueclue et al. | 141/67 |
| 4,947,537 | 8/1990 | Lisec | 29/527.1 |

*Primary Examiner*—Henry J. Recla
*Assistant Examiner*—Casey Jacyna
*Attorney, Agent, or Firm*—John E. Reilly

[57] ABSTRACT

A method and apparatus for simultaneously filling adjacent sides of a window spacer frame with a desiccant material is characterized by a fill head having a discharge port in communication with a desiccant chamber, a releasable clamping device for clamping the open ends of the adjacent sides in alignment with the discharge port, and the chamber is pressurized with air to force the desiccant material through the discharge port for a time interval necessary to fill the sides of the spacer frame. An air conveyor is provided to induce the flow of desiccant material from a reservoir for the purpose of periodically refilling the desiccant chamber when empty, and a filter system in the air conveyor will separate the desiccant material from the air stream while permitting the air stream to be exhausted to atmosphere during the filling operation.

6 Claims, 4 Drawing Sheets

METHOD AND APPARATUS FOR DISPENSING DESICCANT MATERIALS INTO WINDOW SPACER FRAMES

This application is a continuation application of Ser. No. 425,006, filed Oct. 23, 1989 now abandoned, for METHOD AND APPARATUS FOR DISPENSING DESICCANT MATERIALS INTO WINDOW SPACER FRAMES, invented by D. J. Ekren et al.

This invention relates to dispensing comminuted granular materials, such as, a desiccant material; and more particularly relates to a novel and improved method and apparatus for introducing desiccant materials under pressure into window pane spacers, such as, hollow aluminum spacer frames employed in the fabrication of insulated glass units.

BACKGROUND AND FIELD OF THE INVENTION

Desiccant materials are utilized in fine, granular form to fill hollow frames, such as, the hollow spacer frames for insulated glass units in order to minimize the formation of condensation on the inside surfaces between the window panes. Representative of approaches which have been followed in the past is U.S. Pat. No. 3,183,560 to E. Brichard where a dehydrating agent is introduced under vacuum into a tube. In U.S. Pat. No. 3,030,673 to H. J. London, a silica gel is introduced into hollow frame sections for a window; and in U.S. Pat. No. 4,151,696 to R. N. Knights et al the material is a viscous sealing material which is injected under pressure by means of a pumping unit through a series of injection nozzles. Other patents of interest are U.S. Pat. Nos. 2,037,893 to M. Greenan; 3,280,523 to C. E. Stroud et al; 4,261,145 to H. Brocking; 4,660,271 to K. Lenhardt and 4,698,891 to R. Borys.

Among other problems associated with desiccant filling devices which have been utilized in the past for filling spacer frames is the inability to consistently fill a given space or length of frame in a minimum amount of time. In filling, it is desirable to provide for automated filling of different spacer frame lengths and widths and whether or not the frames are bent prior to filling.

SUMMARY OF THE INVENTION

It is therefore an object of the present invention to provide for a novel and improved method and apparatus for dispensing desiccant materials and in particular for the introduction of desiccant materials under pressure into spacer frames of the type employed in insulated glass units.

Another object of the present invention is to provide for a method and apparatus of filling spacer frames for insulated glass units with a desiccant material wherein the material can be injected in a minimum amount of time at a predetermined pressure; and further wherein the apparatus is adaptable for use in filling a wide range of lengths and sizes of spacer frames.

It is a further object of the present invention to provide in a desiccant-filling system for a novel method and means for conveying the material from a bulk packaging container into a chamber which can be pressurized in such a way as to minimize distribution of dust or of wasting or spilling the desiccant material.

It is a still further object of the present invention to provide for an apparatus for injecting desiccant materials into different lengths and types of spacer frames; and further wherein the system is both modular and transportable while requiring a minimum amount of maintenance.

In accordance with the present invention, a method of dispensing desiccant material has been devised and which is specifically adaptable for use in filling open-ended hollow elongated window frame members and comprises the steps of depositing the desiccant material into a normally sealed chamber, positioning at least one open end of a frame member to be filled in communication with the interior of the chamber, and pressurizing the chamber with air so as to force the desiccant material under pressure into the frame member. Preferably, the frame member is releasably clamped in position with respect to a discharge port in the chamber, and the discharge port is selectively opened in coordination with pressurization of the chamber to permit the desiccant material to be forced into the frame member. The chamber is periodically refilled through the utilization of an air conveyor system having fluid amplifiers to induce the flow of desiccant material from a reservoir into a separator which will permit the desiccant material to pass by gravity into the chamber.

In a preferred apparatus in accordance with the present invention, a normally sealed chamber is provided for the desiccant material, a fill head including a discharge port in communication with the interior of the chamber includes means for releasably clamping adjacent sides of a frame member to position the open ends of the adjacent sides in alignment with the discharge port, and means are provided for pressurizing the chamber to force the desiccant material through the discharge port simultaneously into adjacent sides of the frame member. In order to facilitate simultaneous filling of adjacent sides of a frame member, the fill head is provided with opposed, downwardly inclined surfaces extending away from the discharge port, and the releasable clamping means includes a slidable block on each inclined surface which moves toward and away from a fixed block to clamp the frame members therebetween. The fill head is mounted for rotation about a horizontal axis to permit adjustment of the inclination or attitude of the inclined surface.

DETAILED DESCRIPTION OF THE PREFERRED EMBODIMENT

Figure 1:
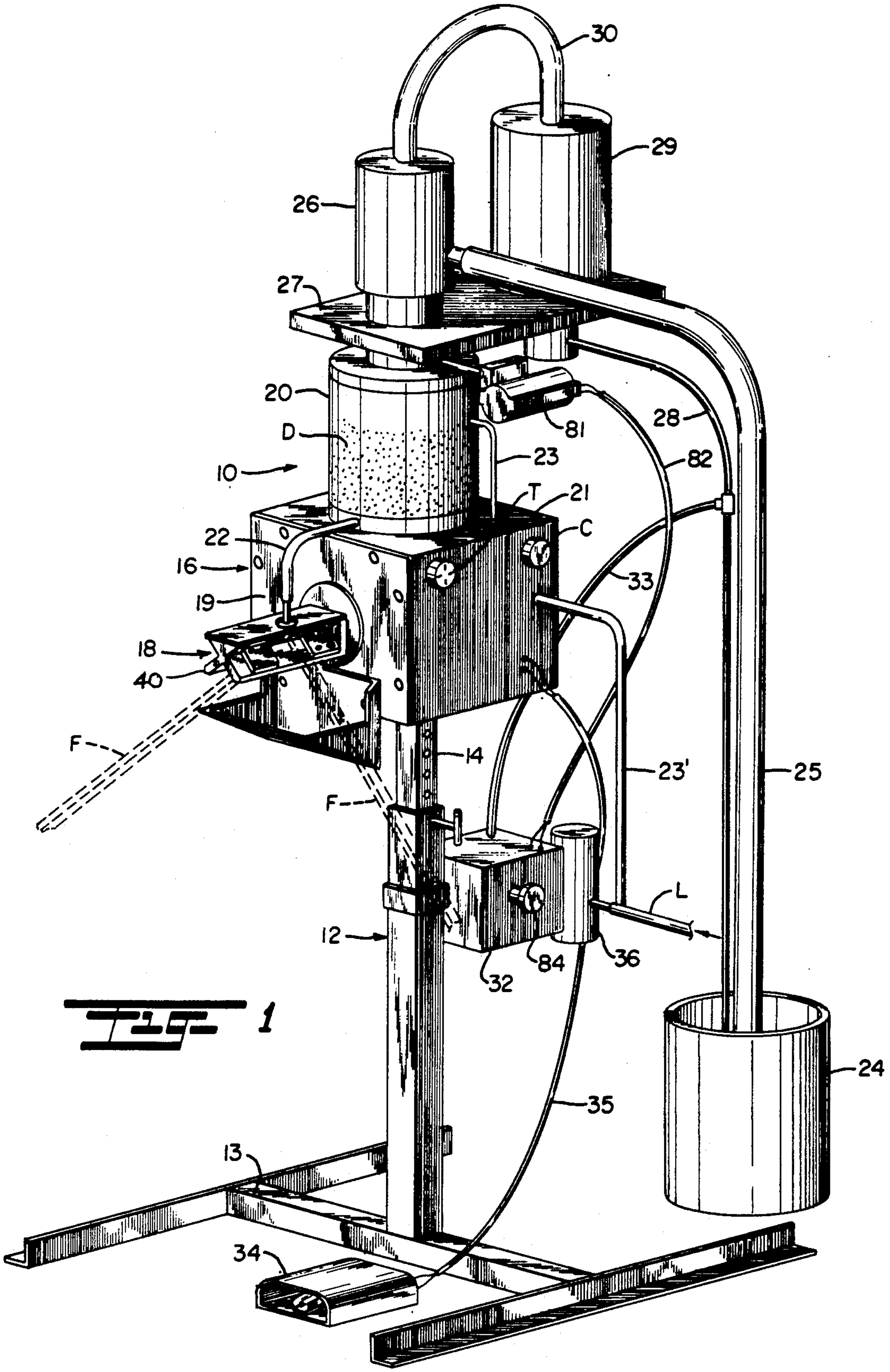
FIG. 1 is a perspective view of a preferred form of apparatus in accordance with the present invention.
Figure 2:
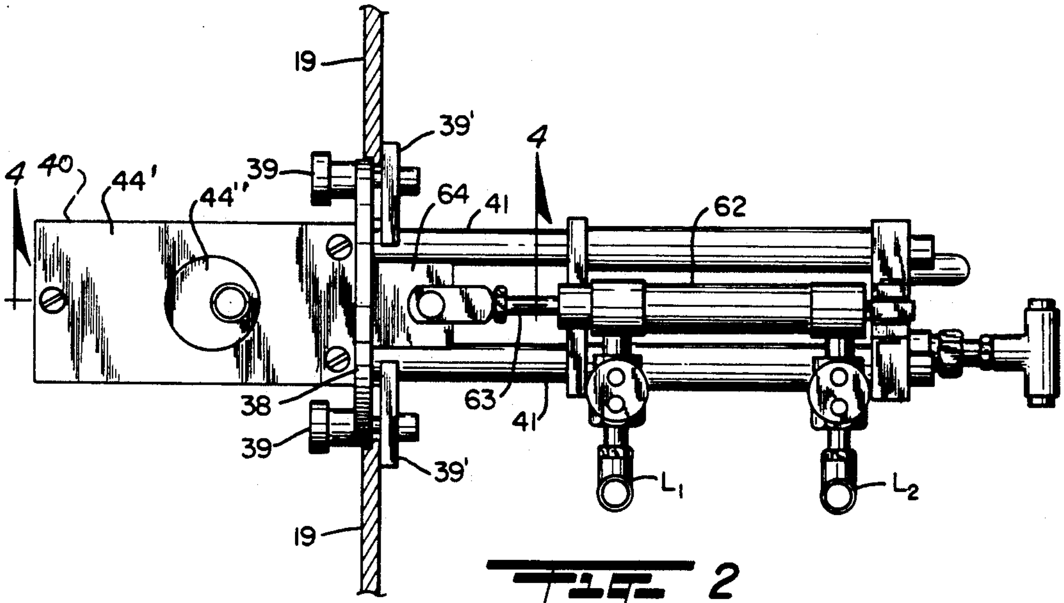
FIG. 2 is an enlarged top plan view of the fill head of the preferred form of the present invention shown in FIG. 1.

Referring in more detail to the drawings, there is illustrated in FIG. 1 a preferred form of desiccant filling apparatus 10 which is broadly comprised of a base 13, a support stand 12 having a telescoping standard 14 and upon which is mounted a control housing 16. A fill head 18 is rotatably mounted in one sidewall 19 of the housing 16 for the purpose of receiving adjacent free legs of a rectangular spacer frame member F and filling the legs F with a desiccant material represented at D which is supplied from a chamber 20 mounted on top surface 21 of the control housing 16. A supply tube 22 extends from the lower end of the chamber 20 for the purpose of delivering desiccant particles from the chamber 20 into the fill head, and the chamber 20 is pressurized by selectively admitting air under pressure from line 23.

Typically, the legs of a spacer frame are perforated along their inner edges, and accordingly, a moisture-absorbing or desiccant material is inserted into at least a pair of the legs to absorb any moisture that would condense on the inside surfaces between the two parallel sheets of glass of an insulated glass unit, not shown. A suitable type of desiccant material is an insulating glass absorbent material manufactured and sold by W. R. Grace & Co. of Baltimore, Md. and is characterized by being a fine bead-like substance. One problem in handling this material, particularly in forcing the material into limited spaces or openings for insulation purposes is its tendency to create dust and to the extent that it can become a health hazard. Thus, while the chamber 20 may be manually filled with desiccant material, it is desirable to provide means for automatically filling the chamber from a larger container or reservoir 24 and in such a way as to be dust-free and completely self-contained. To this end, a pick-up tube 25 extends from the reservoir upwardly into a filter bowl or separator 26 which is mounted on a platform 27 above the chamber 20. In a manner to be described in more detail with respect to FIG. 7, a vacuum is established in the reservoir 24 by directing air under pressure through an air line 28 into air amplifiers at the lower ends of the tube 25 and the filter bowl 29. This vacuum or negative pressure will operate to induce the flow of desiccant material from the reservoir through the pick-up tube 25 into the filter 26. The filter 26 will prevent any of the larger desiccant particles from passing through the connecting tube 30 between the filters 26 and 29. The larger particles of the desiccant material D will therefore be free to advance by gravity into the chamber 20, and any air will pass through the filter 29 and be exhausted to the atmosphere.

An important feature of the present invention resides in the construction and arrangement of the fill head 18. As shown in FIGS. 2 to 6, the fill head 18 comprises an elongated, inverted V-shaped body 40 and a circular mounting plate 38 at the rearward end of the body 40 which is secured to the end of a bolt 41 projecting through the wall panel 19 of the control housing 16. The mounting plate 38 is releasably secured against rotation to the surrounding edge of an opening in the panel 19 by clamping screws 39 which extend through the plate and threadedly engage clamping plates 39' behind the panel 19 to tighten or lock the plate 38 against rotation. When the clamping screws 39 are loosened, the fill head body 40 and the plate 38 can be rotated for a purpose to be hereinafter described. The body 40 has inclined surfaces 42 on opposite sides which slope or diverge downwardly and away from an upper feed area 44, and a horizontal plate 44' has an opening 44" which receives the lower end of the supply tube 22. A fixed guide block 46 and movable block 47 are disposed on each of the inclined surfaces 42 to define a common entrance 48 for insertion of a leg or side of a spacer frame F. The fixed block 46 has an extension plate 49 which extends across the entrance in spaced parallel relation to each inclined surface 42 so as to define a substantially rectangular space or opening at the entrance for insertion of the spacer frame, as best seen from FIG. 6.

Figure 3:
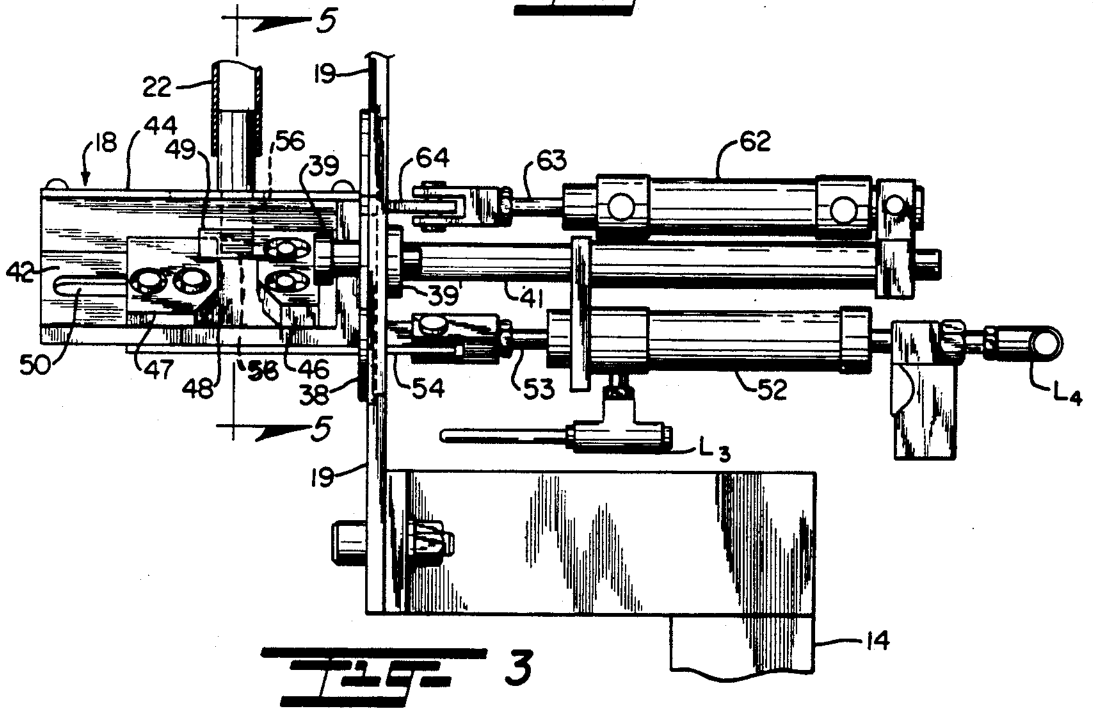
FIG. 3 is a side view of the preferred form of the fill head shown in FIG. 2.
Figure 6:
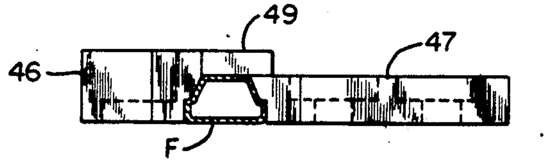
FIG. 6 is a view taken at line 6 of FIG. 5.
Figure 4:
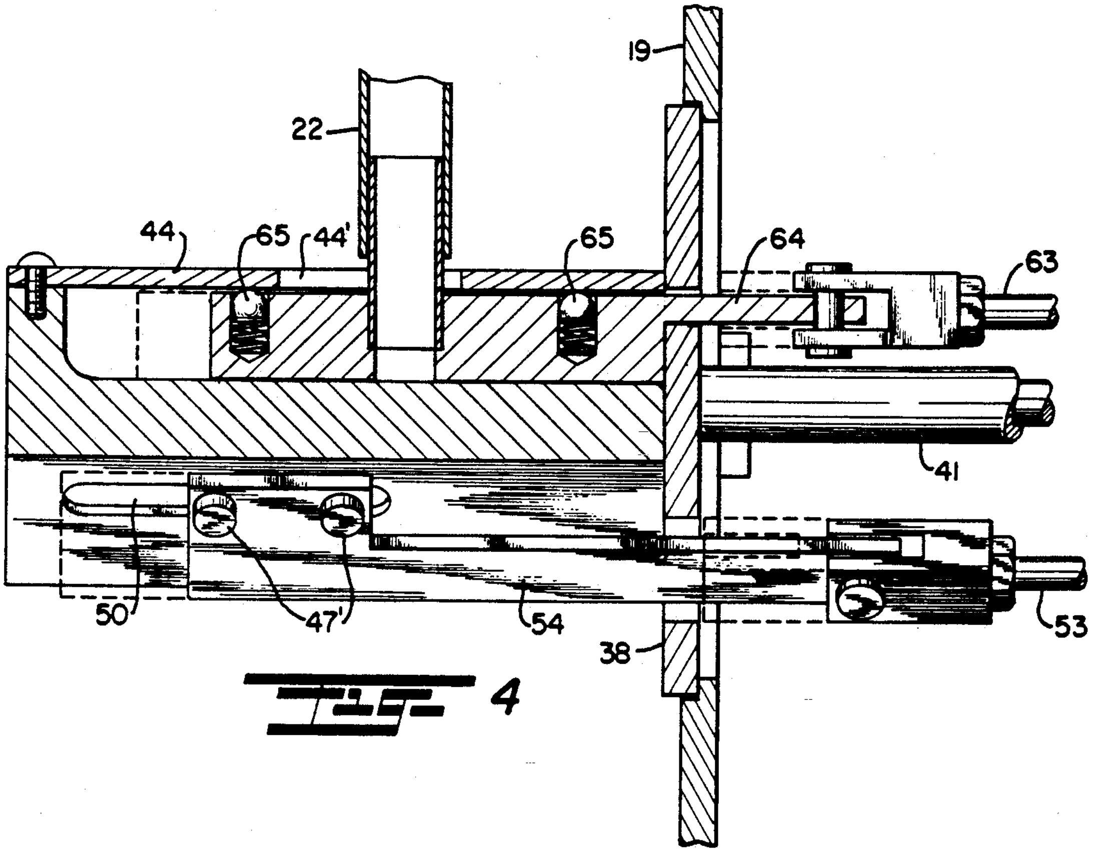
FIG. 4 is a cross-sectional view taken about lines 4—4 of FIG. 2.
Figure 5:
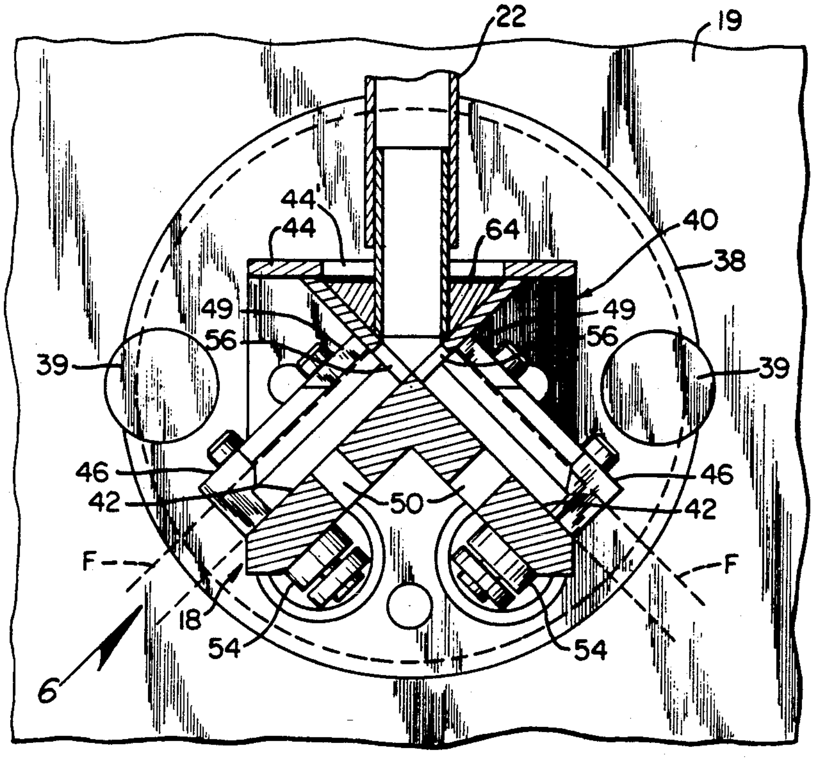
FIG. 5 is a cross-sectional view taken about lines 5—5 of FIG. 3.

Each movable guide block 47 is attached with shoulder bolts 47' slidable in an elongated slot 50 under the control of a double-acting cylinder 52. Each cylinder 52 includes a piston rod 53 pivotally connected to a slide bar 54 which rides beneath each inclined surface 42 and is connected by the shoulder bolts 47' to the block 47 to control its movement along the slot 50 toward and away from the fixed block 46 in response to air under pressure directed into one of the pressure lines $L_3$ and $L_4$. In this way, the block 47 is selectively movable into a closed position, as shown in FIG. 3, to clamp a spacer frame between the blocks 46 and 47 with the upper end of the spacer frame in communication with a discharge port 56 extending downwardly from the feed area 44.

The tube 22 is movable lengthwise of the feed area 44 into and out of alignment with the supply ports 56 under the control of a double-acting cylinder 62 having air pressure lines $L_1$ and $L_2$. A piston rod 63 is pivotally connected to a slide bar 64 with the lower end of the tube 22 affixed to the slide bar for advancement under the control of the piston rod 63. Spring-loaded steel balls 65 yieldingly engage the undersurface of the plate 44 to apply a controlled clamping force to the mating surfaces of the slide bar 64.

Figure 7:
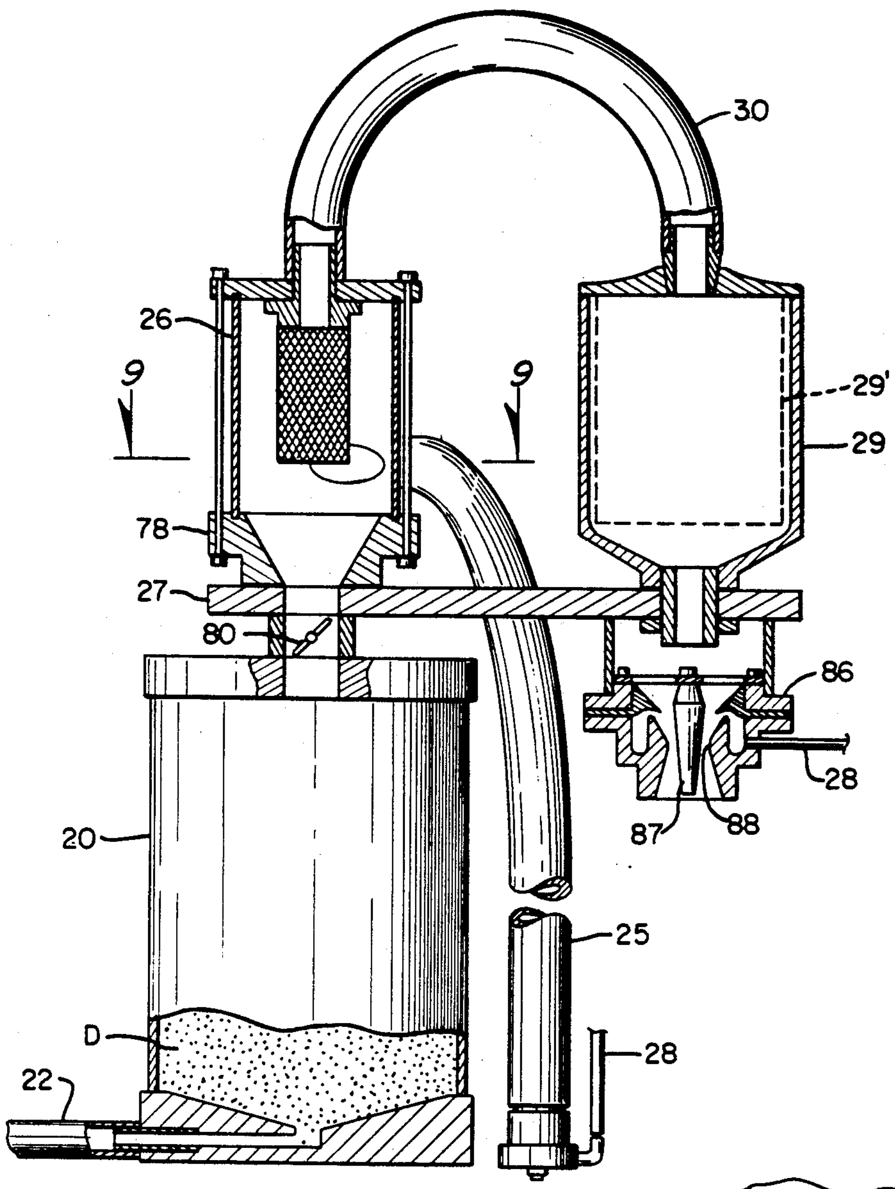
FIG. 7 is an enlarged view in more detail and partially in section of the desiccant fill chambers of the present invention.
Figure 9:
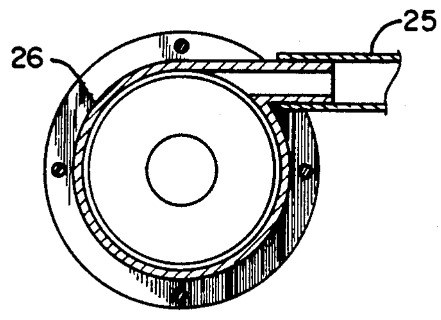
FIG. 9 is a cross-sectional view taken about lines 9—9 of FIG. 7.
Figure 8:
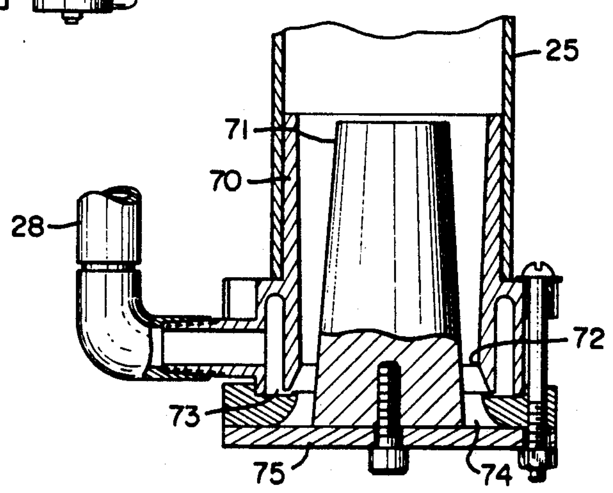
FIG. 8 is a sectional view enlarged and in more detail of the lower end of the pick-up tube for the desiccant fill chambers.

Referring in more detail to the air conveyor assembly, as shown in FIGS. 7 to 9, the lower end of the pick-up tube 25 has an air flow amplifier 70. The air amplifier 70 includes a generally conical plug 71 which is centered within the throat region 72, and air is delivered under pressure through the line 28 to flow through the circumferential inlet 73 and upwardly across the venturi formed between the throat 72 and plug 71 in order to induce upward flow of the desiccant material from the reservoir 24 through the lower open end 74. A bracket 75 is disposed across the opening 74 for the purpose of mounting the plug 71 in centered relation to the throat 72. The desiccant material is drawn with the air through the tube 25 and is fed tangentially into the separator 26 so that the air will follow a circular path tending to draw the desiccant from the air against the wall of the separator and will roll downwardly by gravity through funnel 78 into the desiccant chamber 20. A butterfly valve 80 is positioned across the lower end of the funnel and is controlled by a pneumatic actuator 81, illustrated in FIG. 1, to seal off the separator 26 from the chamber 20 during desiccant fill operations when desiccant is being discharged under pressure from the chamber 20 through the fill head 18. Of course, to refill the chamber 20, the butterfly valve 80 is opened by the actuator 81 which in turn is energized by directing air under pressure via line 82 from a pilot operated valve, not shown, in the housing 32. A manually operated push button valve 84 on the side of the valve housing 32 provides pilot pressure for operation of the valve for the actuator 81 as well as a valve 36 which opens the inlet line L to initiate the air conveyor operation for refilling of the chamber 20.

A second fluid flow amplifier 86 is disposed at the lower end of the filter 29 having a frustoconical plug 87 centered within a generally venturi-shaped throat region 88 and receives air under pressure via the pressure line 28 from the control housing 32. This air is directed into a circumferential recess and caused to pass downwardly through the venturi region 88 to create a negative pressure inducing the air to flow through the filter 29 and overcome any pressure loss across the filter medium 29'. As noted earlier, a minimum velocity of air must be maintained in the pick-up tube 25 in order to carry the largest particles from the desiccant reservoir 24 upwardly into the desiccant chamber; otherwise, lower velocities will transport only the smaller particles or not at all. Accordingly, a minimum outlet pressure from the fluid amplifier 70 is required to overcome the maximum pressure head which will develop as a result of lifting the desiccant through the vertical distance into the desiccant chamber 20.

Referring in more detail to the separator 26, preferably a cyclone separator is employed to separate the desiccant material from the air. By feeding the desiccant in at a tangent, the air flow will follow a circular path through the separator in order to encourage the desiccant to advance outwardly against the wall of the separator and to roll downwardly through the funnel-shaped area 78. A filter screen is mounted in the center of the separator which is coarse enough to allow air and dust particles to exit the top of the separator 26 while blocking the larger desiccant particles. In the filter 29, a cloth bag 29' may provide filtration down to 40 microns. Also, a filter paper can be inserted to filter out particles down to the order of 5 microns. Accordingly, the air amplifier 86 is mounted at the lower end of the filter 29 to overcome the pressure drop across the filter and to increase the pressure differential across the pickup tube 25. For the purpose of illustration, one suitable form of air amplifier for the amplifiers 70 and 86 is that sold under the trademark "TRANSVECTOR" by the Vortec Corporation, Cincinnati, Ohio.

The foot valve 34 includes pressure and return lines designated at 35 into the main housing 16 for controlling the desiccant fill operation. When the foot valve 34 is activated, air is directed under pressure from an external compressed air source, not shown, via the inlet line L through a separate pressure line 23' to the control housing 16. Through suitable valving in the housing 16, the actuation of the foot valve 34 will permit air under pressure to be directed from the pressure line 23' through the upper tube 23 into the top of the chamber 20 in order to pressurize the desiccant in the chamber 20.

In each desiccant fill operation, a fill timer control T on the side of the control housing 32 may be set to regulate the time of each fill; also, a clamping pressure regulator C permits adjustment of the degree of clamping pressure by controlling the amount of air pressure directed into the double acting piston 52 for the slide block 47. Typically, a spacer frame F is of generally rectangular cross-sectional configuration with upper inclined sides or legs terminating in free ends, such as, illustrated in FIG. 6. In accordance with well-known practice, it is necessary only to fill two sides of a spacer frame in order to efficiently dry or remove moisture along the window surfaces when installed. Accordingly, the fill timer T will be set to assure introduction of a specific volume or quantity of desiccant which can be loaded under pressure into the two legs of the frame. The legs of the frame are inserted into the entrances 48 on opposite sides of the end 18 followed by depressing the foot valve 34. Sequentially, when the foot valve is activated, it will cause the clamp or slide blocks 47 to be urged against the ends of the spacer frame, advance the fill tube 22 to a position aligned with the ports 56, followed by introduction of air under pressure into the desiccant chamber D to positively force desiccant material through the fill tube 22 into the legs of the spacer frame and for a time period as determined by the fill switch T. When the foot valve 34 is released, the sequence is reversed to interrupt the flow of air under pressure to the chamber 20, retract the supply tube 22 to a closed position, and release the clamping blocks 47. The spacer frame is then removed and a corner splice or plug is inserted into the free ends of the legs of the spacer frame to retain the desiccant within the frame.

It should be noted that throughout each fill sequence the butterfly valve 80 remains in a closed position to seal the chamber 20. However, when the supply of desiccant in the chamber 20 is depleted, the valve 80 is opened by the pneumatic actuator 81 and air under pressure is then introduced through the pressure line 28 to refill the chamber 20 in the manner described. The air conveyor sequence for refilling the chamber is initiated by the conveyor button 84 on the valve housing 32. Of course, it will be appreciated that the desiccant chamber may be filled manually without the assistance of the air conveyor as described. In addition, the fill head 18 can be rotated within the face plate 19 by loosening the clamps 39, for example, to facilitate handling extended lengths of spacer frames without interference from the floor surface. In certain cases, one side of the fill head 18 may be plugged or blocked off so that the desiccant material is directed only through the raised or upper port 56. Moreover, the adjustable telescoping standard 14 enables suitable height adjustment of the machine according to the size of the spacer frame to be filled.

Accordingly, it is to be understood from the foregoing that various modifications and changes may be made in the construction and arrangement of elements comprising the present invention without departing from the spirit and scope thereof as defined by the appended claims.

We claim:

1. In apparatus for depositing a desiccant material in particle form into two adjacent sides of a rectangular spacer frame member in which said two adjacent sides have adjacent open end portions, the improvement comprising:

a normally sealed chamber containing a desiccant material therein;

a fill head including a single discharge port in communication with the interior of said chamber and means on said fill head for releasably clamping said adjacent sides of said frame member to position both of the open ends thereof in alignment with said single discharge port;

means for pressurizing said chamber whereby to force said desiccant material through said discharge port into said adjacent sides of said frame material;

said fill head having opposed, downwardly inclined surfaces extending away from said discharge port; and means mounting said fill head for rotation about an axis through said fill head and between said downwardly inclined surfaces to vary the angle of inclination of said downwardly inclined surfaces.

2. In apparatus according to claim 1, said releasable clamping means including a fixed block on one side of said discharge port and a slidable block on the opposite side of said discharge port to said fixed block, and means for advancing said slidable block toward and away from said fixed block.

3. In apparatus according to claim 1 including a supply conduit extending between said desiccant chamber and said fill head, and means for advancing said supply conduit between a closed position and an open position aligned with said discharge port for directing desiccant material from said chamber through said discharge port.

4. In apparatus according to claim 3, a valve member interposed between said chamber and said supply conduit, and means for selectively opening and closing said valve member.

5. In apparatus according to claim 1, a desiccant storage reservoir, and air conveyor means for conveying desiccant material from said reservoir into said chamber.

6. In apparatus according to claim 5, said air conveyor means including a separator, and air pick-up means for transporting desiccant material from said reservoir into said separator, and means for filtering said desiccant material from said air conveyor means to exhaust said air to the atmosphere.

* * * * *